United States Patent
Ogawa et al.

(10) Patent No.: US 6,677,406 B2
(45) Date of Patent: Jan. 13, 2004

(54) RESIN COMPOSITION AND MOLDED PRODUCT

(75) Inventors: Ikuko Ogawa, Osaka (JP); Takashi Furusawa, Osaka (JP); Kiyotaka Kawashima, Osaka (JP); Yoshiyuki Ono, Yachimata (JP); Yoshinari Santo, Sakura (JP); Katsuji Takahashi, Sakura (JP)

(73) Assignee: Dainippon Ink and Chemicals, Inc., Tokyo (JP)

( * ) Notice: Subject to any disclaimer, the term of this patent is extended or adjusted under 35 U.S.C. 154(b) by 16 days.

(21) Appl. No.: 10/164,422

(22) Filed: Jun. 10, 2002

(65) Prior Publication Data

US 2003/0187150 A1 Oct. 2, 2003

(30) Foreign Application Priority Data

Mar. 22, 2002 (JP) ............................... P2002-080725

(51) Int. Cl.[7] ............... C08L 67/03; C08L 67/02; C08L 81/04
(52) U.S. Cl. ............... 525/437; 525/537; 524/539
(58) Field of Search ............... 525/437, 537; 524/539

(56) References Cited

U.S. PATENT DOCUMENTS

| | | | |
|---|---|---|---|
| 2,513,188 A | 6/1950 | Macallum | 260/79 |
| 3,274,165 A | 9/1966 | Dedham et al. | 260/79 |
| 3,285,882 A | 11/1966 | Holden | 260/79 |
| 3,322,834 A | 5/1967 | Hill et al. | 260/609 |
| 3,354,129 A | 11/1967 | Edmonds et al. | 260/79 |
| 4,528,346 A | 7/1985 | Sugie et al. | 525/523 |
| 4,954,569 A | 9/1990 | Weymans et al. | |
| 5,475,053 A | 12/1995 | Niessner et al. | |
| 2001/0007888 A1 | 7/2001 | Asano | |

FOREIGN PATENT DOCUMENTS

| | | |
|---|---|---|
| DE | 4206996 A1 | 9/1992 |
| EP | 0576960 A2 | 1/1994 |
| EP | 0704486 A1 | 4/1996 |
| JP | 45-3368 | 11/1964 |
| JP | 44-27671 | 11/1964 |
| JP | 46-27255 | 4/1967 |
| JP | 56-34032 | 12/1975 |
| JP | 53-13468 | 5/1976 |
| JP | 53-57255 | 5/1978 |
| JP | 59-164360 | 9/1984 |

*Primary Examiner*—Patricia A. Short
(74) *Attorney, Agent, or Firm*—Armstrong, Kratz, Quintos, Hanson & Brooks, LLP

(57) ABSTRACT

A resin composition is provided containing a polyarylene sulfide, and an aromatic polyester with a higher glass transition temperature than the polyarylene sulfide and represented by a general formula (1) shown below:

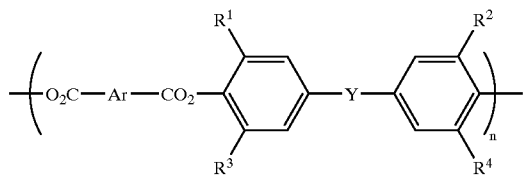

wherein, Ar represents either an aromatic ring or a heterocyclic ring; $R^1$ to $R^4$ each represent a hydrogen atom or an alkyl group of 1 to 8 carbon atoms, which may be the same or different, provided that at least one of these groups is an alkyl group of 1 to 8 carbon atoms; Y represents a single bond, a bivalent hydrocarbon group of 1 to 12 carbon atoms which may incorporate a hetero atom, an oxygen atom, a sulfur atom, etc.; and n is an integer representing the number of repeating units), as well as a molded product produced using such a composition.

12 Claims, No Drawings

RESIN COMPOSITION AND MOLDED PRODUCT

BACKGROUND OF THE INVENTION

1. Field of the Invention

The present invention relates to a resin composition incorporating a polyarylene sulfide (hereafter abbreviated as PAS) with an increased glass transition temperature (Tg), as well as a molded product, a heat resistant molded product produced therefrom, and a soldered molded product of such a heat resistant molded product.

2. Description of the Related Art

PAS compounds, of which polyphenylene sulfide (hereafter abbreviated as PPS) is a representative example, have high melting points, exhibit superior properties of flame resistance and chemical resistance, and offer good fluidity during molding, and as a result, they are widely used as an engineering plastic for the injection molding of various electronic components, mechanical components and automobile components. However, PPS has a low Tg value, and loses durability under high temperature conditions exceeding 100° C., making it unsuitable for use in hot water equipment components and the like. Furthermore, PPS exhibits insufficient heat resistance for use in fields which require high heat resistance such as the use of lead-free solder with electronic circuit board components.

Various blends of PAS with other polymers such as polycarbonate, polyphenylene oxide, polysulfone, and polyether sulfone have been proposed with the object of improving the heat resistance, the impact resistance and the flame resistance of PAS (Japanese Examined Patent Application, Second Publication No. Sho 53-13468, Japanese Examined Patent Application, Second Publication No. Sho 56-34032, and Japanese Unexamined Patent Application, First Publication No. Sho 59-164360). However, in these methods, the Tg of the PAS within the blended product shows absolutely no improvement from the Tg of unblended PAS.

Blends of PAS with aromatic polyesters are disclosed in Japanese Unexamined Patent Application, First Publication No. Sho. 53-57255 and others. However, in these cases also, although the blends are improved in impact resistance, etc., the Tg of the PAS within the blended product shows absolutely no improvement over the Tg of unblended PAS.

Consequently, a resin composition incorporating PAS, which is able to retain a high degree of strength and rigidity and also maintain a good level of hot water resistance, even under high temperature conditions exceeding 100° C., has remained elusive until now.

SUMMARY OF THE INVENTION

An object of the present invention is to raise the Tg value of PAS in order to provide a resin composition incorporating PAS and a molded product produced therefrom, which exhibits superior strength and rigidity and good hot water resistance under high temperature conditions exceeding 100° C.

Furthermore, another object of the present invention is to provide a heat resistant molded product with even greater heat resistance by heat treating a molded product produced from the above resin composition.

In addition, yet another object of the present invention is to provide a soldered molded product by increasing the solder resistance temperature of the above heat resistant molded product.

As a result of intensive research aimed at resolving the issues outlined above, the inventors of the present invention discovered that by mixing PAS with an aromatic polyester of a specific structure and with a Tg value higher than that of PAS, a composition could be obtained which retained the superior moldability of PAS, and yet exhibited improved levels of Tg and heat resistance, and were thus able to complete the present invention.

In other words, the present invention relates to a resin composition comprising a polyarylene sulfide, and an aromatic polyester represented by a general formula (1) shown below, and with a higher glass transition temperature than the polyarylene sulfide,

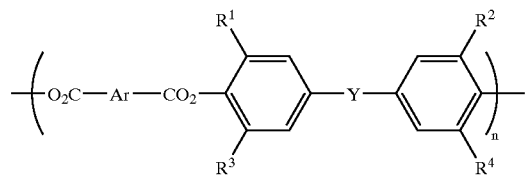

(wherein, Ar represents either an aromatic ring or a heterocyclic ring; $R^1$ to $R^4$ each represent a hydrogen atom or an alkyl group of 1 to 8 carbon atoms, which may be the same or different, provided that at least one of these groups is an alkyl group of 1 to 8 carbon atoms; Y represents a single bond, a bivalent hydrocarbon group of 1 to 12 carbon atoms which may incorporate a hetero atom, an oxygen atom, a sulfur atom, a nitrogen atom, a linkage group in which hetero atoms are bonded together, or a linkage group comprising bonding between hetero atoms and carbon atoms; and n is an integer representing the number of repeating units), as well as a molded product produced using such a composition.

Furthermore, the present invention also relates to a heat resistant molded product obtained by heat treating a molded product formed from the aforementioned resin composition.

In addition, the present invention also relates to a soldered molded product produced by soldering the aforementioned heat resistant molded product.

DETAILED DESCRIPTION OF THE INVENTION

First, a description of a resin composition of the present invention will be given.

A resin composition of the present invention incorporates PAS, and the aforementioned aromatic polyester represented by the general formula (1) with a higher Tg value than PAS. The Tg values were determined using a dynamic viscoelasticity measuring device, in the manner described below. Namely, under conditions including a frequency of 1 Hz and a rate of temperature increase of 4° C./minute, the temperature at the lowest temperature peak of the tan ε peaks obtained was recorded as the value of Tg (° C.) for PAS in the present invention. The values of Tg for both unblended PAS and the PAS within a composition of the present invention were measured in this manner.

The PAS used in the compositions of the present invention is a polymer represented by the structural formula (-Ar-S-)n (wherein Ar represents an arylene group). Examples of the arylene group (-Ar-) include bivalent aromatic residues such as p-phenylene, m-phenylene, o-phenylene, 2,6-naphthalene and 4,4'-biphenylene, or bivalent aromatic residues incorporating at least two 6 carbon membered aromatic rings such as the residues shown below,

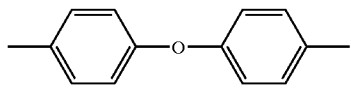

although each of the aforementioned aromatic rings may also comprise substituent groups such as F, Cl, Br or $CH_3$. These polymers may be homopolymers, random copolymers or block copolymers, and may be linear, branched or cross linked. Mixtures of these polymers may also be used.

Of the above polymers, polymers in which the polyphenylene sulfide represented by the general formula (3) shown below accounts for at least 70 ml % of the structural units are preferred, and polymers with at least 90 mol % are even more preferred.

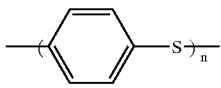

The other structural units incorporated within the PAS, other than the PPS structural units, may include any of the aforementioned arylene groups.

This type of PAS can be synthesized by (1) a reaction between a halogen substituted aromatic compound and an alkali sulfide (refer to U.S. Pat. No. 2,513,188, Japanese Examined Patent Application, Second Publication No. Sho 44-27671, and Japanese Examined Patent Application, Second Publication No. Sho 45-3368), (2) a condensation reaction of a thiophenol in the presence of an alkali catalyst or a copper salt (refer to U.S. Pat. No. 3,274,165), (3) a condensation reaction between an aromatic compound and sulfur chloride in the presence of a Lewis acid catalyst (refer to Japanese Examined Patent Application, Second Publication No. Sho 46-27255), with the particular synthetic method used being chosen depending on the polymer required.

The aromatic polyester used in the present invention is represented by the general formula (1) shown below,

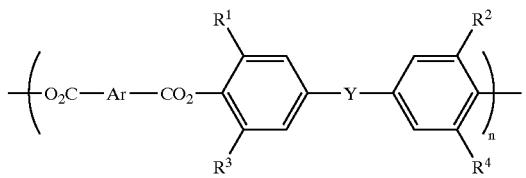

(wherein, Ar represents either an aromatic ring or a heterocyclic ring; $R^1$ to $R^4$ each represent a hydrogen atom or an alkyl group of 1 to 8 carbon atoms, which may be the same or different, provided that at least one of these groups is an alkyl group of 1 to 8 carbon atoms; Y represents a single bond, a bivalent hydrocarbon group of 1 to 12 carbon atoms which may incorporate a hetero atom, an oxygen atom, a sulfur atom, a nitrogen atom, a linkage group in which hetero atoms are bonded together, or a linkage group comprising bonding between hetero atoms and carbon atoms; and n is an integer representing the number of repeating units), and is an aromatic polyester with a higher Tg value than PAS (although hereafter referred to as simply an aromatic polyester).

Such an aromatic polyester is typically produced from an aromatic dicarboxylic acid and an aromatic diol with at least one alkyl group substituent on the aromatic ring, and in order to cause a shift in the Tg value of the PAS within the composition to a higher temperature value, the Tg of the aromatic polyester should preferably be at least 200° C., and even more preferably within a range from 230 to 300° C.

The aromatic polyester should also preferably have a weight average molecular weight within a range from 10,000 to 1,000,000.

Of the aromatic polyesters which meet the above requirements, the aromatic polyesters in which all of the groups $R^1$ to $R^4$ in the above general formula (1) are methyl groups are particularly preferred.

Suitable examples of the Ar grouping within the above general formula (1) include both aromatic ring structures and heterocyclic ring structures such as a benzene ring, naphthalene ring, 9-oxofluorene ring, anthracene ring, anthraquinone ring, biphenylene group, terphenyl group, quaterphenyl group, azobenzene group, furan ring, thiophene ring, 4H-pyran ring, 4-oxo-4H-pyran ring, dibenzofuran ring, dibenzothiophene ring, xanthene ring, dibenzodioxin ring, phenoxathiine ring, thianthrene ring, pyrrole ring, indole ring, carbazole ring, pyrazole ring, imidazole ring, pyridine ring, quinoline ring, bipyridine ring and a pyrimidine ring.

Suitable examples of the Y grouping in the above general formula (1) include a single bond (generating the general formula (2) shown below), $—C(CH_3)_2—$, $—C(CH_3)_2—C_6H_4—C(CH_3)_2—$, $—CH_2—$, $—S—$, $—S(=O)_2—$, $—N=N—$, $—C(=O)—$, and $—O—$.

Of the aforementioned aromatic polyesters, those represented by the general formula (2) shown below, with a Tg value higher than PAS, and with a Tg value which is preferably at least 200° C., and even more preferably within a range from 230 to 300° C., are preferred.

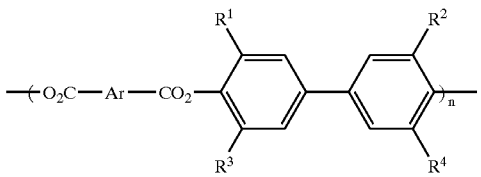

(wherein, Ar represents either an aromatic ring or a heterocyclic ring; $R^1$ to $R^4$ each represent a hydrogen atom or an alkyl group of 1 to 8 carbon atoms, which may be the same or different, although at least one of these groups must be an alkyl group of 1 to 8 carbon atoms; and n is an integer representing the number of repeating units). Of these preferred aromatic polyesters, those in which all of the groups $R^1$ to $R^4$ in the above general formula (2) are methyl groups are particularly preferred.

In the aforementioned general formula (2), the Ar grouping represents the same groupings as described above for the general formula (1).

Suitable examples of the aromatic dicarboxylic acid component of an aromatic polyester of the present invention include various dicarboxylic acids such as phthalic acid, isophthalic acid, terephthalic acid, naphthalene dicarboxylic acid, 9-oxofluorene dicarboxylic acid, anthracene dicarboxylic acid, anthraquinone dicarboxylic acid biphenylene dicarboxylic acid, terphenyldicarboxylic acid, quaterphenyldicarboxylic acid, azobenzene dicarboxylic acid, furan dicarboxylic acid, thiophene dicarboxylic acid, 4H-pyran dicarboxylic acid, 4-oxo-4H-pyran dicarboxylic acid, dibenzofuran dicarboxylic acid, dibenzothiophene dicarboxylic acid, xanthene dicarboxylic acid, dibenzodioxin dicarboxylic acid, phenoxathiine dicarboxylic acid, thianthrene dicarboxylic acid, pyrrole dicarboxylic acid, indole dicarboxylic acid, carbazole dicarboxylic acid, pyrazole dicarboxylic acid, imidazole dicarboxylic acid, pyridine dicarboxylic acid, quinoline dicarboxylic acid, bipyridine dicarboxylic acid and pyrimidine dicarboxylic acid. These dicarboxylic acids also include the various ester derivatives, acid anhydrides and acid halides thereof.

Of the dicarboxylic acids listed above, isophthalic acid and/or terephthalic acid are preferred, and the relative proportions of these dicarboxylic acids, in terms of the aromatic dicarboxylic acid structural units, should preferably be from 5 to 100 mol % of the isophthalic acid component and 95 to 0 mol % of the terephthalic acid component, with values from 60 to 100 mol % for the isophthalic acid component and 40 to 0 mol % for the terephthalic acid component being even more preferred.

Suitable examples of the aromatic diol component of an aromatic polyester of the present invention include various diols with at least two aromatic rings and at least one alkyl group on an aromatic ring. Specific examples include 3,3', 5,5'-tetraalkyl-(1,1'-biphenyl)-4,4'-diols (with the alkyl groups comprising 1 to 8 carbon atoms), 3,3'-dialkyl-(1,1'-biphenyl)-4,4'-diols (with the alkyl groups comprising 1 to 8 carbon atoms), 2,2'-bis(4-hydroxy-3-methylphenyl) propane, 2,2'-bis(4-hydroxy-3-ethylphenyl)propane, α,α'-bis(4-hydroxy-3,5-dimethylphenyl)-1,4-diisopropylbenzene, bis (4-hydroxy-3-methylphenyl) methane, bis(4-hydroxy-3,5-dimethylphenyl)ether, bis (4-hydroxy-3,5-dimethylphenyl)sulfide, bis(4-hydroxy-3,5-dimethylphenyl)sulfone, 4,4'-dihydroxy-3,3'-dimethylazobenzene, and 4,4'-dihydroxy-3,3',5,5'-tetramethylbenzophenone.

Of the above compounds, 3,3',5,5'-tetraalkyl-(1,1'-biphenyl)-4,4'-diols (with the alkyl groups comprising 1 to 8 carbon atoms) are preferred, and 3,3',5,5'-tetramethyl-(1,1'-biphenyl)-4,4'-diol is particularly preferred.

The aromatic polyester of the present invention can be produced using conventionally known polymerization methods. Examples of suitable methods include (1) interfacial polymerization methods in which an aromatic dicarboxylic acid dihalide and an aromatic diol are dissolved in two separate solvents insoluble with each other, and the two liquids are then mixed and stirred in the presence of an alkali and a catalytic quantity of a quaternary ammonium salt to effect a polycondensation, (2) solution polymerization methods in which an aromatic dicarboxylic acid dihalide and an aromatic diol are reacted in an organic solvent in the presence of an alkali compound such as a tertiary amine which acts as a receptor for an acid, and (3) molten polymerization methods in which either an aromatic dicarboxylic acid and an aromatic diester, or an aromatic dicarboxylate diester and an aromatic diol are used as raw materials, and these are subjected to an ester exchange reaction in a molten state, and aromatic polyesters obtained via any of these methods can be used.

A resin composition of the present invention can be produced by mixing the aforementioned PAS and the aromatic polyester using conventional methods.

In a resin composition of the present invention, it occurs only by using an aromatic diol with a substituent group on the aromatic ring as the diol component of the aromatic polyester, that the Tg value of the PAS within the composition can be shifted towards a higher temperature. The mechanism of this Tg shift remains somewhat unclear, although the inventors of the present invention have surmised that when the PAS and the aromatic polyester are combined, a phenomenon occurs to increase the Tg value of the PAS within the composition to a higher value than that of unblended PAS, either as a result of the substituent group on the aromatic polyester increasing the affinity with the PAS and improving the compatibility, or as a result of a reaction between the PAS and the aromatic polyester. It is already known that in the case of polymer alloys formed from two polymers with different Tg values, usually an improvement in compatibility leads to a phenomenon in which the Tg value of the polymer with the lower Tg value in the composition shifts to a higher value. However, the fact that until now no PAS blended compositions comprising another polymer have exhibited this phenomenon, indicates the uniqueness of the results observed by the inventors of this invention.

In a resin composition of the present invention, the relative mixing ratios of the PAS and the aromatic polyester should preferably be from 99.9 to 20 parts by mass of the PAS and from 0.1 to 80 parts by mass of the aromatic polyester, with compositions comprising from 95 to 50 parts by mass of the PAS and from 5 to 50 parts by mass of the aromatic polyester being even more preferred. Compositions in which the proportion of the aromatic polyester falls within the above range are preferred, as the Tg value of the PAS within the composition can be increased even further, and properties such as the fluidity during molding and the heat resistance can also be further improved.

Conventional fibrous or granulated fillers may also be added to a resin composition of the present invention if required.

The amount of such fillers added should preferably be within a range from 3 to 400 parts by mass per 100 parts by mass of the combination of the PAS and the aromatic polyester, and provided the amount of filler is kept within this range, a variety of properties such as strength, rigidity, heat resistance, and dimensional stability can be further improved.

Specific examples of fillers which can be used in the present invention include glass fiber, carbon fiber, glass milled fiber, boron fiber, whiskers of materials such as potassium titanate and zinc oxide, alumina fiber, asbestos, silicon carbide, aramid fiber, ceramic fiber, metal fiber, gypsum fiber, mica, talc, wollastonite, sericite, kaolin, clay, bentonite, alumina silicate, zeolite, and silicates such as pyrophyllite, as well as carbonates such as calcium carbonate, magnesium carbonate and dolomite, sulfates such as calcium sulfate and barium sulfate, metal oxides such as alumina, magnesium oxide, silica, zirconia, titania and iron oxide, as well as glass beads, ceramic beads, boron nitride, silicon carbide and calcium phosphate, and these materials may be used singularly, or in combinations of two or more materials.

The above fillers may be either hollow, or treated with the type of silane based or titanium based coupling agents typically used as treatment agents.

Furthermore, a resin composition of the present invention may also comprise a silane compound. Examples of suitable silane compounds include either one, or two or more of aminoalkoxysilanes, epoxyalkoxysilanes, or vinylalkoxysilanes.

Within the aforementioned group of aminoalkoxysilanes, any silane compound with at least one amino group and at least two alkoxy groups within each molecule is effective, and specific examples include γ-aminopropyltriethoxysilane, γ-aminopropyltrimethoxysilane, N-β-(aminoethyl)-γ-aminopropyltriethoxysilane, N-β-(aminoethyl)-γ-aminopropyltrimethoxysilane, N-β-(aminoethyl)-γ-aminopropylmethyldiethoxysilane, N-β-(aminoethyl)-γ- aminopropylmethyldimethoxysilane, N-phenyl-γ-aminopropyltriethoxysilane, and N-phenyl-γ-aminopropyltrimethoxysilane.

Furthermore, within the aforementioned group of epoxyalkoxysilanes, any silane compound with at least one epoxy group and at least two alkoxy groups within each molecule is effective, and specific examples include γ-glycidoxypropyltriethoxysilane, γ-glycidoxypropyltrimethoxysilane, and β-(3,4-epoxycyclohexyl)ethyltrimethoxysilane.

In addition, within the aforementioned group of vinylalkoxysilanes, any silane compound with at least one vinyl group and at least two alkoxy groups within each molecule is effective, and specific examples include vinyltriethoxysilane, vinyltrimethoxysilane and vinyltris(β-methoxyethoxy)silane.

The blend amount of this type of silane compound which can be used in the present invention is preferably from 0.01 to 5 parts by mass, and even more preferably 0.1 to 2 parts by mass, per 100 parts by mass of the aforementioned combination of the PAS and the aromatic polyester.

Where necessary, other conventional additives may also be included in small amounts in a composition of the present invention, provided the inclusion of such additives does not impair the actions and effects of the composition. Examples of such additives include mold releasing agents, coloring agents, heat resistance stabilizing agents, ultraviolet stabilizers, lubricants, plasticizers, foaming agents, flame retardants, flame retardant auxiliaries, and rustproofing agents.

Furthermore, the various ultraviolet absorption agents, antioxidants and antistatic agents may also be added to a composition of the present invention to improve the weather resistance, the oxidation resistance, and the antistatic properties, provided such addition does not impair the heat resistance of the composition.

Preparation of a resin composition of the present invention can be performed by various conventional methods including methods wherein the raw materials are premixed in a mixer such as a tumbler or a Henschel mixer, subsequently supplied to a typical molten mixing device such as a uniaxial or biaxial extruder, a Banbury mixer, a kneader or a mixing roller, and then mixed together at a temperature of between 200 and 500° C. sufficient to melt the mixture, before being converted into pellets, as well as methods in which the PAS and the aromatic polyester are dissolved in a specific solvent and then mixed in a dissolved state.

A resin composition of the present invention exhibits a Tg value for the incorporated PAS which is higher than that for the unblended PAS, and consequently offers superior strength and rigidity in high temperature environments exceeding 100° C., and also possesses good hot water resistance, making the composition particularly useful in applications which require good levels of heat resistance.

A resin composition of the present invention can be used in the production of molded products via a variety of conventional molding methods including injection molding, extrusion molding, injection compression molding, compression molding, and blow molding, although of these methods, this type of composition is particularly suited to injection molding.

A description of a molded product of the present invention follows.

A molded product of the present invention is produced using an aforementioned resin composition.

A molded product formed from a resin composition of the present invention can be converted to a heat resistant molded product, with a Tg value which has been raised even further, by subjecting the molded product to heat treatment, and furthermore such treatment also produces an improvement in the solder resistance temperature.

There are no particular restrictions on the conditions for the heat treatment of the molded product, although the heat treatment temperature, in other words the surface temperature of the molded product, should preferably be kept within a range from 5 to 100°C. below the melting point of the PAS, and even more preferably from 10 to 85° C. below the melting point.

The melting point described above refers to the value measured in accordance with JIS K7121 using a differential scanning calorimeter DSC7 manufactured by PerkinElmer Instruments Inc.

The length of the heat treatment varies depending on the heat treatment temperature used, although the heat treatment should preferably be at least one minute. There are no particular restrictions on the upper time limit for the heat treatment, although heat treatments of not higher than 1000 hours are preferred.

Furthermore, there are no particular restrictions on the actual heat treatment method used for treating the molded product, and methods in which the molded product is simply heated for a predetermined time inside a heating device capable of maintaining the surface of the molded product at a predetermined temperature are suitable. There are no particular restrictions on this heating device, and devices such as a heat circulating electric oven are suitable.

A heat resistant molded product produced by heat treatment of a molded product formed from a resin composition of the present invention has sufficient heat resistance to enable soldering to be performed, and can consequently be applied to articles which are soldered to substrates, namely soldered molded products. For example, an article can be produced by soldering the leads protruding from a heat resistant molded product housing a chip such as an IC to a wiring board. In such a case, even under conditions where the surface temperature of the substrate to which the heat resistant molded product is to be soldered exceeds 230° C., the soldering can still be performed without the molded product melting or undergoing any deformation.

Furthermore, a heat resistant molded product of the present invention can also be soldered using so-called "lead free" solders. In other words, even in the case of the soldering conditions required for lead free solder systems such as Sn—Ag systems, Sn—Bi systems, Sn—Cu systems or Sn—Zn systems, which are typically several dozen degrees higher than 230° C., an article can still be produced by soldering the leads protruding from a heat resistant molded product housing a chip such as an IC to a wiring board, and even though the surface temperature of the soldered substrate can reach temperatures as high as 280° C., the soldering can still be performed without the molded product melting or undergoing any deformation.

In this description, the surface temperature of the soldered substrate refers to the actual temperature measured at the surface of the substrate during the soldering step of the surface mounting technology. Furthermore, the substrate refers to a printed wiring board or circuit board used in the surface mounting process.

A soldering process of the present invention can utilize conventional processes, and in a suitable example, a substrate is placed on a heat resistant belt inside a heating oven (reflow oven) used in a surface mounting process, and the belt is then moved in conveyor style to heat the substrate.

Examples of applications which can take advantage of the superior mechanical strength, heat resistance, solvent resistance and electrical properties of a resin composition of the present invention include the fields of electrical and electronic components, and mechanical components, and specific components include connectors, coil bobbins, various sockets, condensers, variable condensers, optical pickups, various terminal boards, plugs, magnetic head bases, pipes for use in vehicles, air intake nozzles, intake manifolds, carburetors, lamp sockets, lamp reflectors, lamp housings and hot water mechanical components.

EXAMPLES

As follows is a more detailed description of the present invention, based on a series of examples, although the present invention is in no way limited to the examples presented here.

The various measurements in the reference examples, the comparative examples and the examples were conducted in accordance with the methods described below.

(1) Method of measuring melt viscosity

The melt viscosity ($\eta$) of each product PPS was measured under the following conditions using a Koka type flow tester.

Measurement temperature: 300° C.

Shear rate: 100 mm/second

Nozzle bore diameter: 0.5 mm, length 1.0 mm (2) Method of measuring Tg

The value of Tg was determined from the results of measuring the dynamic viscoelasticity. Using a piece of the resin composition with dimensions of 50 mm×10 mm and 2 mm thick as a test specimen, and using a DMS6100 manufactured by Seiko Instruments Ltd. as the measuring device, the viscoelasticity was measured across a temperature range from 20 to 270° C. using a frequency of 1 Hz and a rate of temperature increase of 4° C./minute. In the resulting data, either one, or a plurality of tan $\delta$ peaks are revealed, and the Tg (° C.) value of the PPS was reported as the temperature at the lowest temperature peak.

(3) Method of measuring melting point:

Melting points were measured in accordance with JIS K7121 using a differential scanning calorimeter (DSC7, manufactured by PerkinElmer Instruments Inc.)

(4) Method of measuring retention of flexural modulus of elasticity:

A test specimen of thickness 3.0 mm was prepared from a resin composition, and the flexural modulus of elasticity was measured in accordance with ASTM D-790. The ratio between the flexural modulus of elasticity at room temperature and the flexural modulus of elasticity at 120° C. is shown in Table 1 as the 120° C. flexural modulus of elasticity retention rate.

(5) Method of evaluating the external appearance of a molded product following reflow heating assuming a soldered product:

A box shaped connector with dimensions of length 70 mm, width 10 mm, height 8 mm and thickness 0.8 mm was formed from a resin composition. This molded connector was subsequently heat treated for 10 hours at a surface temperature of 270° C., mounted on a special epoxy resin substrate, and then inserted in an infrared reflow device (TPF-2, manufactured by Asahi Engineering Ltd.) and heated. The conditions for the reflow heating followed a preset temperature profile including 100 seconds at a surface temperature exceeding 200° C., 90 seconds at a temperature of at least 220° C., 80 seconds at a temperature of at least 240° C., and 60 seconds at a temperature of at least 260° C. The maximum surface temperature reached by the substrate was 280° C. Following completion of the reflow heating, the box shaped connector was visually inspected, and assigned one of the two following grades.

A: No variations noticeable in the external appearance

B: Surface flow or melting visible

Reference Example 1

Preparation of polyphenylene sulfides PPS-1 and PPS-2

In an autoclave equipped with a distillation vent, a monomer solution supply line and a nitrogen gas inlet was placed 9.55 kg of sodium hydrosulfide (NaSH.2H$_2$O), 4.05 kg of sodium hydroxide and 50.0 kg of N-methylpyrolidone, and the mixture was subsequently dewatered with stirring, under an atmosphere of nitrogen, for one hour at 190° C.

The autoclave was then sealed, and to the dewatered system heated to 200° C. was added, over a 40 minute period, a solution of 14.8 kg of p-dichlorobenzene and 10 kg of N-methylpyrolidone, and the resulting mixture was reacted under pressure for four hours at 220° C., and the temperature then raised to 240° C. and the reaction was allowed to proceed for a further two hours. The product polymer was separated, and then washed with hot water, acetone, methanol, and N-methylpyrolidone to yield a polymer PPS-1. The melt viscosity of the PPS-1 was 30 Pa·s, the melting point was 285° C., and the tan $\delta$ peak temperature (in other words, Tg) was 111° C.

A sample of the polymer PPS-1 was oxidized in air for two hours at 250° C. to yield a polymer PPS-2. The melt viscosity of the PPS-2 was 200 Pa·s, the melting point was 286° C., and the tan $\delta$ peak temperature was 110C.

Reference Example 2

Preparation of a Polyphenylene Sulfide PPS-3

A sample of the PPS-1 was dispersed in water, hydrochloric acid was used to adjust the pH to 4, and filtration and repeated washing was then used to produce a polymer PPS-3. The melt viscosity of the PPS-3 was 28 Pa·s, the melting point was 285° C., and the tan $\delta$ peak temperature was 110° C.

Reference Example 3

Preparation of an Aromatic Polyester PAR-1

In a polymerization vessel equipped with a stirring blade and a nitrogen gas inlet, 2.42 kg of 3,3',5,5'-tetramethyl-1, 1'-biphenyl-4,4'-diol (10.0 mols) and 50 g of meta-cresol was dissolved in 30 L of deoxygenated water containing 1.0 kg of sodium hydroxide, yielding an aqueous solution. In a separate vessel, 64 g of tetrabutylammonium bromide, 1.62 kg (8.0 mols) of isophthalic acid chloride, and 0.41 kg (2.0 mols) of terephthalic acid chloride were dissolved in 5 L of dichloromethane to generate an organic solution.

With the aforementioned aqueous solution being stirred under an atmosphere of nitrogen, the organic solution was added to the polymerization vessel, and following continuous stirring for 30 minutes at 25° C., the aqueous phase was removed. The organic solvent phase, which contained the product, was washed repeatedly with distilled water, and was then poured into an acetone bath. The precipitate which formed was collected and washed with acetone to yield an aromatic polyester. This aromatic polyester was subsequently vacuum dried in a vacuum dryer for three hours at 200° C. at a reduced pressure of approximately 10 Pa to yield 3.2 kg of the aromatic polyester PAR-1.

The tan δ peak temperature of this aromatic polyester PAR-1 was 292° C.

Reference Example 4

Preparation of an Aromatic Polyester PAR-2

With the exceptions of substituting the 3,3',5,5'-tetramethyl-1,1'-biphenyl-4,4'-diol from the reference example 3 with 1.86 kg (10.0 mols) of 4,4'-biphenol, an aromatic polyester PAR-2 was synthesized in the same manner as the reference example 3. The tan δ peak temperature for the aromatic polyester PAR-2 was 310° C. This aromatic polyester PAR-2 contains no alkyl groups on the aromatic ring, and as such does not represent the type of aromatic polyester required as an essential component of the present invention.

Reference Example 5

Preparation of an Aromatic Polyester PAR-3

Using 2.84 kg (10.0 mols) of 4,4'-isopropylidenebis(2,6-dimethylphenol), an aromatic polyester PAR-3 was synthesized in the same manner as the reference example 4. The tan δ peak temperature for the aromatic polyester PAR-3 was 260° C.

Examples 1 to 3, and Comparative Examples 1 to 4

The polymers PPS-1 to PPS-3 and the aromatic polyester compounds PAR-1 to PAR-3 obtained in the reference examples, as well as commercially available aromatic polyesters were uniformly mixed at the ratios shown in Table 1 and Table 2. Subsequently, a vented biaxial extruder TEM-35B, manufactured by Toshiba Machine Ltd., was used to conduct a molten mixing operation at 320° C. in which 40 parts by mass of chopped strands of glass fiber of length 3 mm and fiber diameter of 10 μm were supplied via a side feeder for every 60 parts by mass of the polymer, thereby producing a resin composition.

Each resin composition was used to prepare a test specimen for measuring the dynamic viscoelasticity and a test specimen for measuring the flexural modulus of elasticity, and the PPS side tan δ peak temperature and the flexural modulus of elasticity retention rate at 120° C. were then evaluated.

Example 4 and Comparative Example 5

Using the relative compositions shown in Table 3, sheet molded products of dimensions 20 mm×100 mm and 2 mm thick, and box shaped connector molded products were produced using the resin compositions obtained in the examples and the comparative examples. Each sheet molded product was subjected to heat treatment at 270° C. for the predetermined time periods shown in Table 3, and the PPS side tan δ peak temperature evaluated in each case.

Each box shaped connector was subjected to heat treatment at 270° C. for 10 hours, and then underwent further reflow heating, before the external appearance of the connector molded product was evaluated.

TABLE 1

|  | Example 1 | Example 2 | Example 3 |
|---|---|---|---|
| Composition |  |  |  |
| PPS-1 | — | 42 | — |
| PPS-2 | 42 | — | — |
| PPS-3 | — | — | 51 |
| PAR-1 | 18 | — | 9 |
| PAR-2 | — | — | — |
| PAR-3 | — | 18 | — |
| U-100[1] | — | — | — |
| Calibre 300-10[2] | — | — | — |
| Glass fiber | 40 | 40 | 40 |
| PPS side tan δ peak temperature (° C.) | 140 | 135 | 130 |
| Flexural modulus of elasticity retention rate (120° C.; %) | 96 | 94 | 96 |

TABLE 2

|  | Comp. Example 1 | Comp. Example 2 | Comp. Example 3 | Comp. Example 4 |
|---|---|---|---|---|
| Composition |  |  |  |  |
| PPS-1 | — | — | 42 | 42 |
| PPS-2 | 60 | 42 | — | — |
| PPS-3 | — | — | — | — |
| PAR-1 | — | — | — | — |
| PAR-2 | — | 18 | — | — |
| PAR-3 | — | — | — | — |
| U-100[1] | — | — | 18 | — |
| Calibre 300-10[2] | — | — | — | 18 |
| Glass fiber | 40 | 40 | 40 | 40 |
| PPS side tan δ peak temperature (° C.) | 111 | 111 | 111 | 111 |
| Flexural modulus of elasticity retention rate (120° C.; %) | 60 | 60 | 60 | 60 |

Notes:
In Table 1 and Table 2, the terms U-100 and Calibre 300-10 refer to the materials described below.
[1]U-100: An aromatic polyester (U polymer), manufactured by Unitika Ltd. U-100 is an aromatic polyester formed from 4,4'-isoproplidenebisphenol, isophthalic acid and terephthalic acid, and has a tan δ peak temperature of 203° C.
[2]Calibre 300-10: A polycarbonate manufactured by Sumitomo Dow Limited, with a tan δ peak temperature of 155° C.

Notes: In Table 1 and Table 2, the terms U-100 and Calibre 300-10 refer to the materials described below.

1) U-100: An aromatic polyester (U polymer) manufactured by Unitika Ltd. U-100 is an aromatic polyester formed from 4,4'-isopropylidenebisphenol, isophthalic acid and terephthalic acid, and has a tan δ peak temperature of 203° C.

2) Calibre 300-10: A polycarbonate manufactured by Sumitomo Dow Limited, with a tan δ peak temperature of 155° C.

TABLE 3

|  | Example 4 | Comparative Example 5 |
|---|---|---|
| Composition |  |  |
| PPS-2 | 51 | 60 |
| PAR-1 | 9 | — |
| Glass fiber | 40 | 40 |

TABLE 3-continued

|  | Example 4 | Comparative Example 5 |
|---|---|---|
| Time of heat treatment at 270° C. and Value of PPS side Tg (° C.) | | |
| 0 hours | 130 | 111 |
| 2 hours | 135 | 111 |
| 5 hours | 137 | 111 |
| 10 hours | 140 | 111 |
| External appearance after reflow heat treatment[3] | A (no change) | B (melted) |

Note:
The external appearance after reflow heat treatment detailed in Table 3 refers to inspection of a sample treated in the following manner.
[3] Reflow heating was conducted on a test specimen which had already been subjected to 10 hours of heat treatment at 270° C.

Note: The external appearance after reflow heat treatment detailed in Table 3 refers to inspection of a sample treated in the following manner.
3) Reflow heating was conducted on a test specimen which had already been subjected to 10 hours of heat treatment at 270° C.

What is claimed is:

1. A resin composition comprising a polyarylene sulfide, and an aromatic polyester with a higher glass transition temperature than said polyarylene sulfide and represented by a general formula (1):

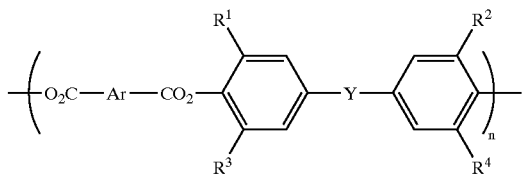

wherein, Ar represents either one of an aromatic ring and a heterocyclic ring; $R^1$ to $R^4$ each represent either one of a hydrogen atom and an alkyl group of 1 to 8 carbon atoms, which may be identical or different, provided that at least one of $R^1$ to $R^4$ is an alkyl group of 1 to 8 carbon atoms; Y represents any one of a single bond, a bivalent hydrocarbon group of 1 to 12 carbon atoms which may incorporate a hetero atom, an oxygen atom, a sulfur atom, a nitrogen atom, a linkage group in which hetero atoms are bonded together, and a linkage group comprising bonding between hetero atoms and carbon atoms; and n is an integer representing a number of repeating units.

2. A resin composition according to claim 1, wherein said aromatic polyester has a higher glass transition temperature than said polyarylene sulfide and is a material represented by a general formula (2):

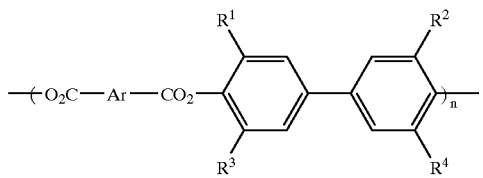

wherein, Ar represents either one of an aromatic ring and a heterocyclic ring; $R^1$ to $R^4$ each represent either one of a hydrogen atom and an alkyl group of 1 to 8 carbon atoms, which may be identical or different, provided that at least one of $R^1$ to $R^4$ is an alkyl group of 1 to 8 carbon atoms; and n is an integer representing a number of repeating units.

3. A resin composition according to claim 1, comprising an aromatic polyester in which $R^1$ to $R^4$ of said general formula (1) are all methyl groups.

4. A resin composition according to claim 1, comprising from 99.9 to 20 parts by mass of said polyarylene sulfide, and from 0.1 to 80 parts by mass of said aromatic polyester.

5. A resin composition according to claim 1, wherein said aromatic polyester comprises from 5 to 100 mol % of an isophthalic acid component and from 95 to 0 mol % of a terephthalic acid component as aromatic dicarboxylic acid structural units.

6. A resin composition according to claim 1, further comprising a filler.

7. A resin composition according to claim 6, comprising 100 parts by mass of combined said polyarylene sulfide and said aromatic polyester, and from 3 to 400 parts by mass of said filler.

8. A molded product produced using a resin composition according to claim 1.

9. A heat resistant molded product produced by heat treating a molded product according to claim 8.

10. A heat resistant molded product according to claim 9, wherein a surface temperature of said molded product during heat treatment is from 5 to 100° C. below a melting point of said polyarylene sulfide.

11. A soldered molded product produced by soldering a heat resistant molded product according to claim 9.

12. A soldered molded product produced by soldering a heat resistant molded product according to claim 9 with a lead free solder.

* * * * *